United States Patent [19]

Beller

[11] Patent Number: 5,001,971
[45] Date of Patent: Mar. 26, 1991

[54] SHISH KABOB ROTISSERIE

[75] Inventor: Frank W. Beller, Aurora, Ill.

[73] Assignee: Belson Manufacturing Co., Inc., North Aurora, Ill.

[21] Appl. No.: 523,600

[22] Filed: May 15, 1990

[51] Int. Cl.⁵ .......................... A23C 3/00; A47J 37/04
[52] U.S. Cl. ..................................... 99/421 H; 99/419; 99/421 R; 99/421 A
[58] Field of Search ...................... 99/419, 420, 421 R, 99/421 A, 421 H, 421 HH, 421 HV, 421 M, 421 P, 421 TP, 421 V; 426/523; D7/381, 383; 126/9 R, 25 R, 25 A

[56] References Cited

U.S. PATENT DOCUMENTS

| 501,867 | 7/1893 | Cacciatori | 99/421 HV |
| 2,580,549 | 1/1952 | Jacobson | 99/421 H |
| 2,710,575 | 6/1955 | Overman | 99/421 H |
| 3,217,635 | 11/1965 | Scavullo | 99/419 |
| 3,447,445 | 6/1969 | Koziol | 99/421 R |
| 3,866,527 | 2/1975 | Katris | 99/421 H |
| 4,158,992 | 6/1979 | Malafouris | 99/421 HV |
| 4,176,592 | 12/1979 | Doyle, Jr. | 99/419 |
| 4,403,595 | 9/1983 | Maesk | 126/25 A |
| 4,815,367 | 3/1989 | Hanson et al. | 99/421 H |
| 4,839,186 | 6/1989 | Boyle | 426/523 |

FOREIGN PATENT DOCUMENTS

| 246008 | 11/1962 | Australia | 99/421 H |
| 933813 | 8/1963 | United Kingdom | 99/421 HV |

Primary Examiner—Timothy F. Simone
Attorney, Agent, or Firm—Lee, Mann, Smith McWilliams & Sweeney

[57] ABSTRACT

A shish kabob rotisserie for placement over the firebox of an outdoor grill provides a motor-driven center drive chain assembly for rotationally driving a plurality of transversely arranged skewers having double skewer members releasably attached. The double skewer members resiliently and tightly holding two loadings of food items to be cooked on a support skewer rod. The rotisserie being a portable frame-like device that is detachably mountable to a grill.

17 Claims, 3 Drawing Sheets

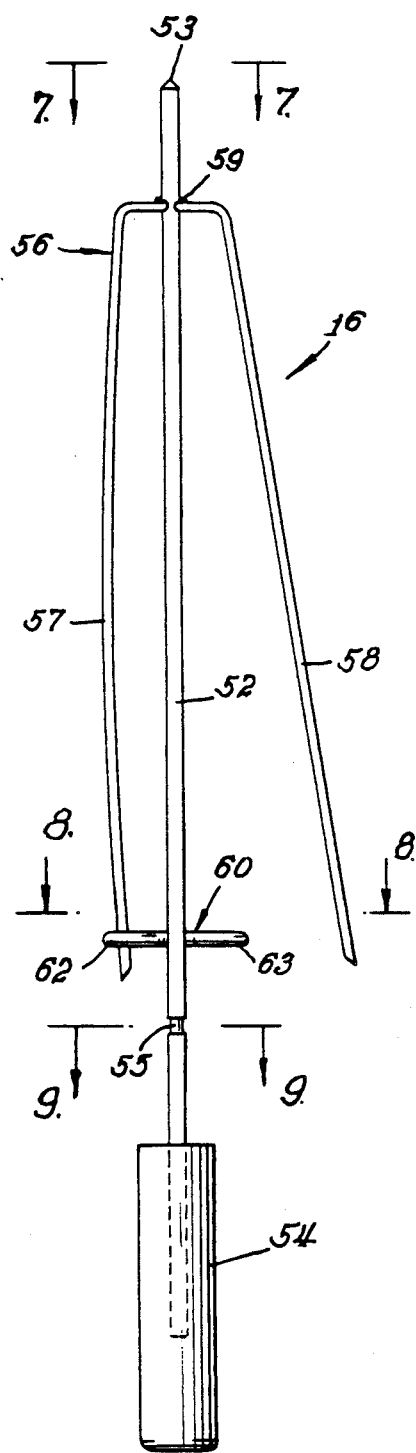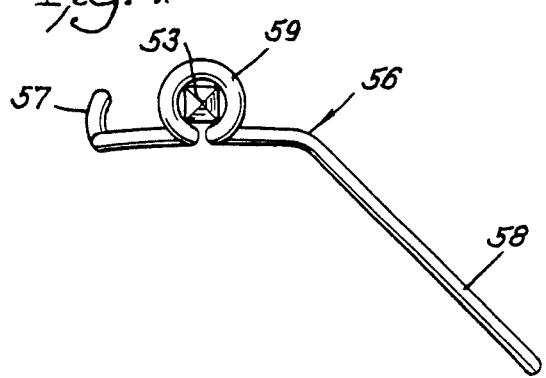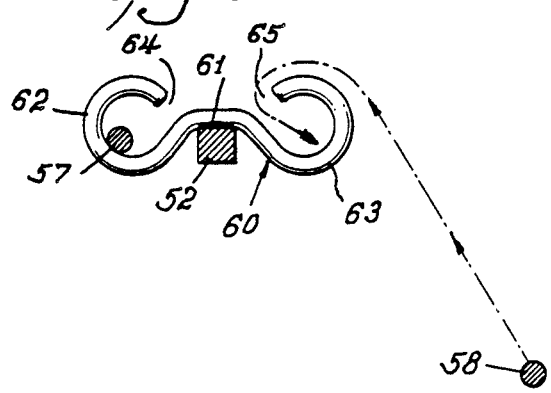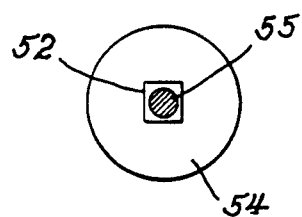

SHISH KABOB ROTISSERIE

BACKGROUND OF THE INVENTION

In general the invention relates to the outdoor cooking of food in shish kabob style. More specifically, the invention relates to a shish kabob rotisserie having a plurality of skewers which is adaptable as an attachment over the fireboxes of outdoor grills. More particularly, the invention relates to a skewer having a double-tined resilient skewer member attachable to a center skewer rod to securely hold food during rotisserie cooking.

Outdoor shish kabob cooking is a well-known technique. Usually a pointed skewer rod is pushed through a variety of small items to be cooked. Then, the skewer holding the food is placed onto or over a grill and periodically turned by hand for even cooking. Some devices provide for the rotisserie cooking by rotating a skewer over a grill.

A concern in shish kabob cooking is to prevent the food from spinning on the skewer rod as it cooks. If the foodstuff to be cooked spins on the skewer rod it does not evenly cook and may, such as in the case of certain vegetables, become detached and fall into the charcoal, or onto the hot grill.

Due to the inherent tedium in turning each shish kabob, large volume shish kabob roasting devices have heretofore not met with success. It is initially time consuming to pierce a variety of foods on a skewer, then evenly cook them, and lastly remove them for eating. At large outdoor social activities, such as club picnics, fairs, carnivals, and the like, shish kabob food creates a very labor intensive undertaking by the food preparer in cutting, handling, skewering the items and then rotating the kabobs during roasting. Typically, a shish kabob involves the cooking of cubed size pieces of beef or fowl along with tomatoes, shrimp, potatoes, mushrooms, green peppers, onions, and a variety of other items. Usually, in this style of cooking the food item is about the size of the palm of one's hand or smaller.

Larger items might also be held on a skewer rod and cooked over a grill, such as chicken, cornish game hen, duck and the like. Naturally, these larger items require that they be firmly secured and not spin during cooking. It would be desirable to be able to provide for the simultaneous shish kabob cooking of the typical smaller items along with the contemporaneous rotisserie cooking of these larger items without the need for changing equipment or manner of operation, so that a uniform technique can be undertaken for all items to be cooked in a rotisserie arrangement.

It is therefore a paramount object of the invention to provide a device that is adaptable for use as an attachment over the firebox of outdoor and indoor grills, typically of a rectangular shape, which can accommodate a plurality of skewers to be rotated.

It is a key object of the invention to provide a driving assembly for skewer rods which may arranged parallel to one another in relatively close formation, so that a plurality of shish kabob prepared foodstuffs can be achieved.

It is an important goal of the invention to provide a double skewer member resiliently engageable to a larger center skewer rod that is driven by a rotisserie assembly.

It is a concomitant object of the invention to provide a double skewer member that holds two sets of kabobs, each skewered on a separate tine and both tines resiliently attached to the driven center skewer rod.

It is a further goal of the invention to provide a double skewer assembly engageable to a rotisserie apparatus for rotation above a source of heat.

It is yet another object of the invention to provide for the securement of a larger food item, such as a chicken, duck, etc., on a center supporting skewer rod by resilient fastening at a double skewer member in order that rotisserie style cooking may take place without the foodstuff spinning on the skewer.

It is also an object of the invention to hold the typically smaller kabob items on the tines of a double skewer member in a spring-like grip to prevent free-spinning of the food items during cooking in order to attain uniform cooking.

It is an allied goal of the invention to provide for a portable and detachable shish kabob rotisserie device having extending handles so that the device may be easily attached at grill support panels over the firebox of an outdoor grill.

It is a related object of the invention to provide an attachable shish kabob rotisserie device enabling the individual engagement and disengagement of double skewers and supporting skewer rods to be made so that cooking at different locations and durations over the firebox can be undertaken.

It is also a goal of the invention to provide an attachable shish kabob rotisserie device that permits larger food items to be cooked in combination with the usual smaller items in the same operation without changing apparatus or manner of operation.

SUMMARY OF THE INVENTION

For achieving the foregoing objects and goals, a shish kabob rotisserie is provided which is adaptable for attachment to outdoor grill devices over the grill firebox. The device includes side rails having bearing means for rotationally supporting center or support skewer rods. The center skewer rods carry double skewers that are resiliently attached to the center skewer rod to tightly grasp food items. At the central long axis of the shish kabob rotisserie device a continuous chain drive rotatingly drives coupling assemblies which are engaged by oppositely directed pairs of double skewers and support skewer rods. Tips of the skewer rods are inserted into opposite bores of the coupling assemblies and are rotatably driven thereby. Pairs of opposing double skewers are therefore capable of being rotationally driven at either side of the chain drive assembly. The chain drive is operated by a rotisserie motor assembly attached to the shish kabob rotisserie device, which is arranged to be outwardly of the end walls of a firebox. Each center skewer rod is manually detachable from the coupling assemblies of the chain drive without the need to stop the chain drive and without interruption of cooking at any other skewers in use. The double skewers are resiliently disengageable from the support skewer rods to be taken to the diner for consumption of the food held thereon while the previous support skewer rod may be subsequently resiliently engaged by a next loaded double skewer for cooking another set of kabobs. A handle member of non-heat conductive material is joined at the opposite ends of the support skewer rods to be spaced outwardly from the side rails, so that the support skewer rods may be handled without fear of burns to the hands of the chef. The chain drive is enclosed by fastening two elongate angles to form a longitudinal tunnel-like housing for the chain drive and coupling assemblies therewithin. Corresponding and opposing apertures are spaced therealong providing openings to expose the engageable bores of the coupling assemblies for the engagement of the ends of the support skewer rods.

The double skewers have an end loop slidable over the center skewer rod and two skewer tines resiliently spaced, which at rest forming an acute angle therebetween. Upon being pinched closer together, the tines are resiliently engaged at a double-yoke retainer that is fixed to the center skewer rod, whereby the ends of the tines of the double skewer are resiliently held on the center skewer rod.

Thereby, upon impaling a variety of food items to be cooked, the tines of the double skewers tightly hold the food items generally against the center skewer rod in a non-spinning arrangement.

BRIEF DESCRIPTION OF THE DRAWINGS

Reference will now be made to the attached drawings wherein like reference numerals throughout refer to the same elements.

FIG. 6 is a plan view of a skewer having a double skewer member with one tine resiliently engaged at a retainer of a support skewer rod, and the other tine free;

FIG. 7 is an end view of the skewer of FIG. 6 taken along line 7—7 looking in the direction of the arrows and showing an end loop of the double skewer member engaged over the center skewer rod and showing the free tine and the engaged tine;

FIG. 8 is a sectional view of the double skewer assembly taken along the line 8—8 of FIG. 6 looking in the direction of the arrows and showing the double yoke retainer fixed to the center or support skewer rod and further showing the one tine of the double skewer member that is resiliently engaged thereat with the free tine spaced therefrom ready to be engaged as illustrated by the arrow line; and, FIG. 9 is a sectional view of the skewer shown in FIG. 6 taken along lines 9—9 and showing a circular wooden handle at the end of the support skewer rod and a circular groove in the support skewer rod for bearing support at the side rails.

DETAILED DESCRIPTION OF THE INVENTION

Figure 1:
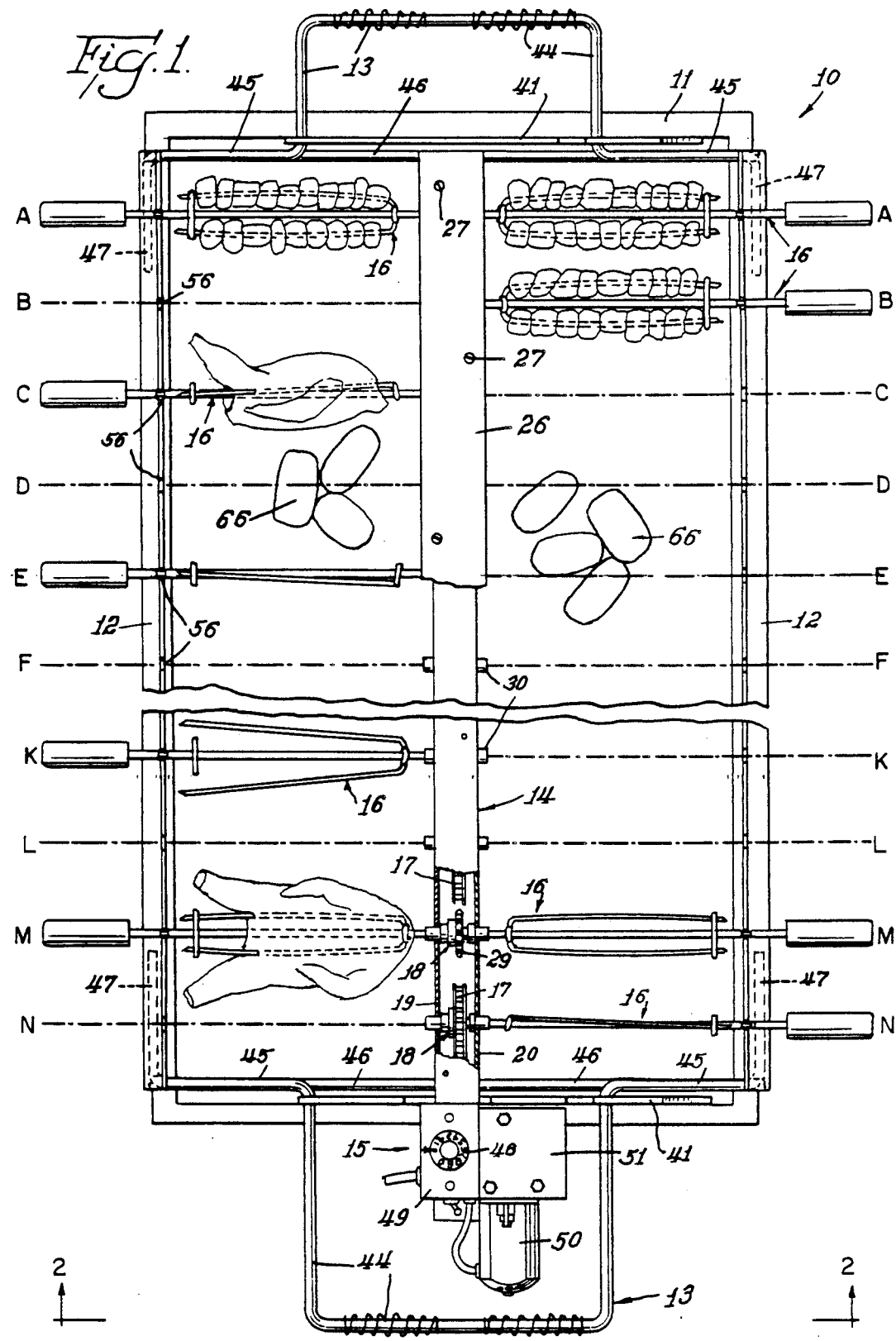
FIG. 1 is a plan view of the shish kabob rotisserie device showing several skewers engaged to the chain drive and rotationally supported at side rails, wherein at several locations skewers are illustrated holding different food items to be cooked in rotisserie-like fashion.

With initial reference to FIG. 1, the invention will be understood as comprising a shish kabob rotisserie 10 which is useful as an attachment over a grill firebox 11. The rotisserie 10 is a frame-like manually portable apparatus having side rails 12 which are joined at opposite ends by handles 13. Longitudinally and centrally of the rotisserie 10 resides a chain drive assembly 14 driven by a rotisserie motor assembly 15. The chain drive assembly 14 rotates a plurality of skewers 16, pairs of which may transversely oppose at either side of the chain drive assembly 14. In FIG. 1 a variety of foodstuffs are shown supported on the plurality of skewers 16. The skewers 16 are identical and are shown in various arrangements with some holding different things in order to fully explain the invention. The locations of pairs of skewers 16 are designated A–N. The rotisserie 10 is partly broken away between spaces F and K in order to allow for greater detail to be shown in the figure. Accordingly, in the embodiment disclosed, there is the capacity for twenty-eight skewers 16, i.e. a pair each at the locations A–N. At location A two fully loaded skewers 16 are shown ready to be cooked. At location C a chicken is shown held on the skewer 16. At locations E and N a skewer 16 is shown from either side. At location M one skewer 16 is shown impaling a chicken to be roasted and at the opposite side a closed empty skewer 16 is shown in a plan view.

The chain drive assembly 14 is also shown partly broken away in FIG. 1 to expose the driving arrangement. The chain drive assembly 14 comprises a chain 17 that is driven by the motor assembly 15 to rotate coupling assemblies 18, one of each being located at locations A–N for the driving of two skewers 16 thereat. The drive assembly 14 will be further understood in reference to FIGS. 4 and 5. The chain 17 and coupling assemblies 18 reside within a tunnel-like box formed by two angles 19 and 20 for the passage of the chain 17 and extending from the motor assembly 15. The angle 19 is attached to the angle 20 at three places between locations A and N, which provides a hollow sleeve 21 opening to an aperture 22 through bracket 19 and an aperture 23 through angle 20. Thereby, a bolt 24 may be passed through the sleeve 21 to be thread engaged by a nut 25 at the opposite side to secure the angle 19 to the angle 20.

Figures 4, 5:
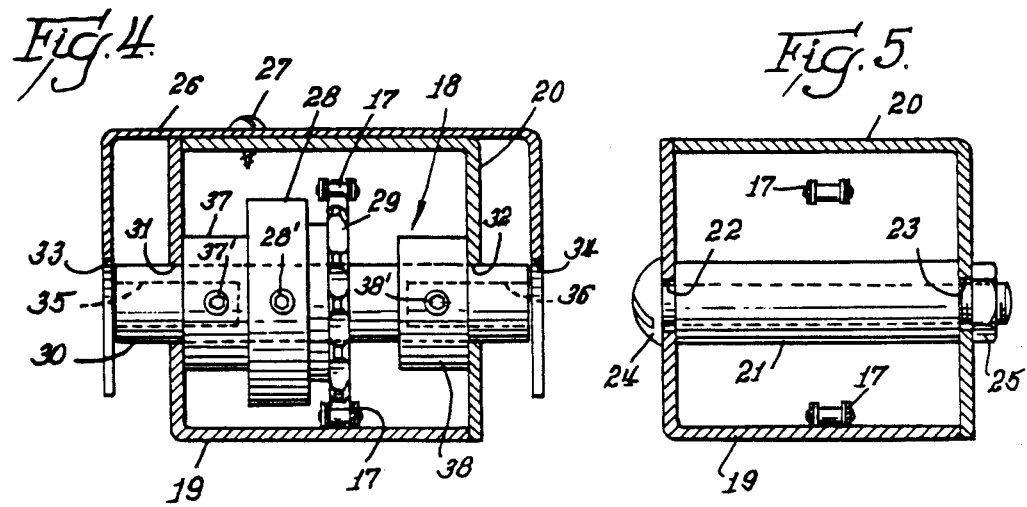
FIG. 4 is a sectional view taken along and transversely to the chain drive showing a tunnel-like housing for the chain, an outer cover and a coupling assembly driven by the chain for the driving engagement to a center skewer rod at either side.
FIG. 5 is another sectional view of the chain drive taken at a spacer pipe extending across the tunnel-like housing for a nut and bolt means to secure together two angles forming the tunnel-like housing.

As shown in FIG. 4, a cover 26 is fastened by metal screw fasteners 27 atop the angles 19, 20. The cover 26 may be formed of bright shiny steel to be easily cleaned of grease, kept sanitary, and also provide an aesthetic surface therealong.

The coupling assemblies 18 comprise a central integral hub 28 and sprocket 29, which the chain 17 drives. A set screw 28' attaches the hub 28 and thereby the sprocket 29 to a drive shaft 30 which extends through an aperture 31 of angle 19 and an aperture 32 of angle 20 at each location A–N to extend outwardly of the angles to terminate at notches 33 and 34 of the cover 26. The drive shaft 30 has prismatic bores 35 and 36 for the driving attachment of the skewer 16 as will be described hereinafter. Preferably the drive shaft 30 terminates at said apertures 33, 34 so as not to extend horizontally outwardly of the cover 26. Spacer collars 37 and 38 are attached at opposite sides of the hub 28 and sprocket 29 to the drive shaft 30 by means of set screws 38' and 39', respectively. The spacer collars 37 and 38 are provided to generally, centrally guide the chain 17 within the longitudinal tunnel-like passages formed by the angles 19 and 20. The notches 33 and 34 of the cover 26 downwardly open so as to fit over the drive shaft 30 allowing the cover 26 to be separately removed by the unfastening of the screw fasteners 27 for cleaning and granting access to the angles 19, 20, plus the interior of the chain drive assembly 18.

Figure 2:
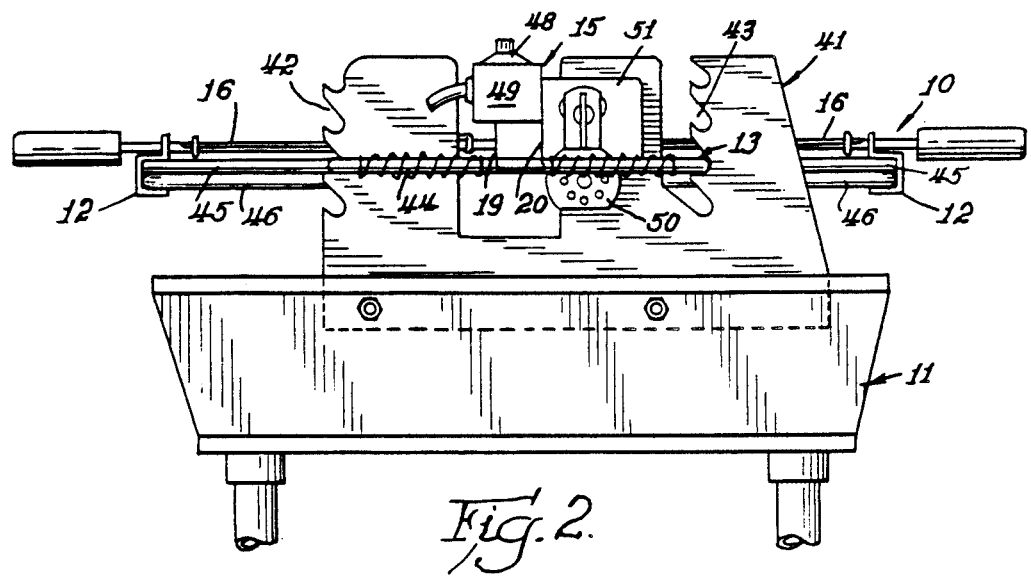
FIG. 2 is an end view of the rotisserie device in the direction shown by the arrows 2—2 of FIG. 1, and further showing the attachable support of the rotisserie device on grill support panels mounted to the firebox of a grill.
Figure 3:
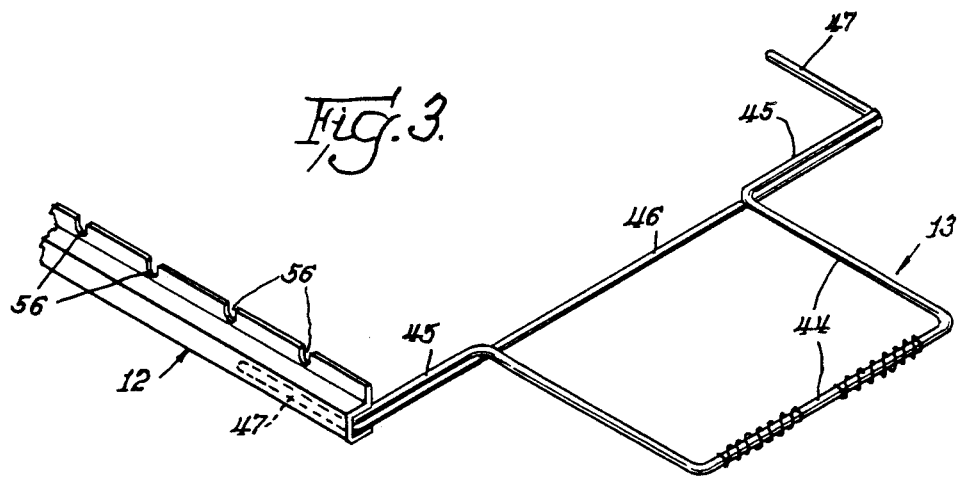
FIG. 3 is a perspective view of a portion the handle and a side rail of the rotisserie device.

Detachable mounting of the rotisserie 10 over the firebox 11 is facilitated by the engagement of the handles 13 in opposing support panels 41, which are mirror images. One support panel 41 is shown in FIG. 2. In FIG. 2, the rotisserie 10 is shown at one end of the firebox 11 with the panel 41 mounted to the firebox 11 and including sets of support grooves 42, 43. The grooves 42, 43 provide for vertical adjustable positioning of the rotisserie 10 and are useable in adjustable grill arrangements as disclosed in my U.S. Pat. No. 4,592,335. With included reference to FIG. 3, it will be seen that the handle 13 is a frame-like structural member in addition to providing the handle function. The handle 13 comprises a conventional handle-shaped portion 44 terminating in oppositely directed arms 45 that are transverse to the long axis of the firebox 11 and weld-engaged to a U-shaped arm 46 that extends across the end of the firebox 11. The U-shaped arm 46 terminates in parallel longitudinally directed arms 47 that are weld-engaged to the side rails 12. The handle 13 thereby forms a connective and rigidifying frame-like structure in cooperation with the side rails 12. In dashed lines in FIG. 1, the relationship of the arms 47 to the side rails 12 is shown. The arrangement of the handle 13 with the side rails 12 at opposite ends makes it possible for the rotisserie 10 to be lifted to and from the support panels 41 at the slots 42, 43 in adjustable elevations above the firebox 11 depending upon heat required and type of items to be cooked.

The motor assembly 15 may be of a conventional design, as shown, providing a 110 volt variable speed chain drive capacity. It is shown with a speed control knob 48 at a control housing 49 for varying the speed of an electric motor 50. The control housing 49 is mounted at the ends of the angles 19, 20 and the motor 50 is mounted alongside on a bracket 51.

With reference now to FIGS. 6-9 the unique skewer 16 is depicted in greater detail and will be seen as providing a very useful apparatus for the resilient attachment of food items for shish kabob rotisserie cooking in rotisserie 10. The skewers 16 have a center or support skewer rod 52, which in the exemplary embodiment is square in section and pointed at one end 53. At the opposite end a wood handle 54 is attached. Spaced axially from the handle 54 is a circular cut-out notch 55 which is provided to rotate in bearing support notches 56 formed in the side rails 12, as shown in FIG. 1. Removably attached to the center skewer rod 52 is a double skewer member 56 having two side skewer tines 57, 58 resiliently joined at an end loop 59. At rest, the side skewer tines 57, 58 form an acute angle therebetween which causes a resilient attachment when squeezed toward one another to engage at a double yoke retainer 60 that is weld-engaged at 61 to the center skewer rod 52. The retainer 60, as illustrated in a face view in FIG. 8, includes yokes 62, 63 which are discontinuous loops open at 64, 65, respectively, for the passage therethrough of the side skewer tines 57, 58.

In operation, food items, such as those shown at location A of FIG. 1, are (1) speared by the side skewer tines 57, 58, (2) then the skewer rod 52 is passed through the end loop 59, and (3) the side skewer tines 57, 58 are squeezed into resilient engagement at the yokes 62 and 63 to firmly hold the food items against the skewer rod 52 and prevent them from spinning while cooking.

The engagement of the skewer 16 to the chain drive assembly 14 is made by the pointed end 53 inserted within the prismatic bores 35 or 36 of any drive shaft 30. In reference to FIG. 9, the circular groove 55 is spaced along the center skewer rod 52 to allow for a rotational bearing engagement at notches 56. Each skewer 16 is independently detachable from the rotisserie 10 without need to stop the motor assembly 15 and chain 17.

As an additional feature, the center skewer rod 52 also may be used to penetrate or pierce a food item to be cooked, particularly items of a larger size, such as the chickens shown in FIG. 1 at locations C and M. In this manner, the center skewer rod 52, will have the pointed end 53 penetrate through the chicken body and then next the side skewer tines 57, 58 may be passed through opposite sides of the wings or breast of the fowl. Likewise, the end loop 59 is passed over the pointed end 53 and along the center skewer rod 52 until the ends of the side skewer tines 57, 58 are in a position to be resiliently flexed through the open portions 64, 65 of the retainer 60 to thereby very securely hold the fowl to be cooked.

In preferred form the double skewer member 56 is made of $\frac{1}{8}$ inch bright wire and the center skewer rod is $\frac{1}{4}$ inch square cold formed steel bar. The circular groove 55 has a diameter of 5/32 inch in the preferred embodiment and length of 3/16 inch for rotational engagement at the bearing support notches 56. The retainer 60 is also preferably formed of $\frac{1}{8}$ inch bright wire. At rest, the side tines 57, 58 form an acute angle of about 10° to 20° therebetween and lie in a plane that is at an oblique angle of about 100° to 110° to the loop 59. This construction results in spring biasing when attached to the support skewer rods 52, as shown at locations E and N of FIG. 1 and by the bent, flexed condition of side tine 57 in FIG. 6.

The rotisserie 10 is shown in conjunction with the utilization of a typical combustible heat source comprising charcoal briquettes 66 generally illustrated in FIG. 1. However, the heat source that may be provided in the firebox 11 is not limited to charcoal and can be, among other sources, gas burners, mesquite or wood.

The shish kabob rotisserie 10 provides for easy portability and attachment over a firebox of an outdoor grill. In the disclosed embodiment twenty-eight skewers 16 may be provided to be attached at locations A-N so that 56 ample servings may be held at the double skewer members 16. In this embodiment the useable length between the loop 59 to the attachment at the retainer 60 provides about 9 full inches of skewer length. When roasting large chickens, for example, the skewers 16 may be positioned at every other location of A-N to provide a space therebetween. All large items may all be placed at one side of chain drive assembly 18, as shown in FIG. 1, while at the other side of the chain drive assembly 14 a different skewer arrangement can be made. Thus, typical shish kabob cooking of smaller food items may be at one side and larger items at the other. Numerous other combinations of course can be achieved.

The skewer rods 52 are provided in a length to extend from the attachment at the prismatic bores 35 or 36 outwardly of the side rails 12 so that the wooden handles 54 may be spaced sidewardly of the firebox 11 to be grasped without the cook's hand coming injuriously close to the hot firebox 11. The support skewer rods 52 need not be uniform in cross-section and are only required to have a configuration at the pointed end that is engageable with the bores 35, 36. Thus, in the exemplary embodiment, only the portion in the bores 35, 36 need to be square. The remainder of the rod could be triangular, circular, polygonal, etc. Also, the prismatic bores 35, 36 could also be otherwise shaped if complementary to the shape of the rod for releasable driving engagement therewith. The invention is not limited to a rod and bore engagement, however.

It will also be understood that the double skewer members 56 may be filled with items on either or both skewer tines 57, 58. When a kabob is fully cooked, the double skewer member 56 may then be detached and removed from the center skewer rod 52 for delivery of the kabob food items to the diner. Another double skewer member 56 with a batch of items to be cooked may then be attached to the same center skewer rod 52 and the loaded skewer 16 then engaged to the rotisserie 10 at a location A–N so that a continuous cooking operation may be achieved.

While the invention has been described in conjunction with a single embodiment, it will be clear to those skilled in the art that various other equivalents and embodiments fall within the range of invention and ambit of the claims appended hereto.

What is claimed is:

1. A shish kabob rotisserie device comprising:
   spaced apart side rails having bearing support means;
   handle and frame means joining said side rails;
   skewer drive means extending longitudinally between said side rails and drivingly engaging a plurality of coupling assemblies;
   motor means for operating the skewer drive means;
   a plurality of skewer means having frontward ends engageable to the skewer drive means at said coupling assemblies, food securing means, and means for rotational engagement at said side rail bearing support means; and,
   wherein said skewer means may be rotated by said skewer drive means and extend transversely between said side rails in independently engageable attachments at said coupling assemblies.

2. The shish kabob rotisserie as in claim 1 wherein said skewer drive means comprises a chain drive.

3. The shish kabob rotisserie as claimed in claim 2 wherein said coupling assemblies include a sprocket drivingly engaged by said chain drive and opposite engageable apertures for drivingly receiving the frontward ends of said skewer means.

4. The shish kabob rotisserie as claimed in claim 1 wherein said skewer means include a double skewer member.

5. The shish kabob rotisserie as claimed in claim 4 wherein said double skewer members have resiliently engageable double tines attachable to the center skewer rod, and wherein an end of said center skewer rod comprising said frontward ends engageable to said skewer driving means.

6. The shish kabob rotisserie as claimed in claim 5 wherein at an end opposite said drive-engaged end of said center skewer rod said skewer means including handle means attached to said center skewer rod.

7. The shish kabob rotisserie as claimed in claim 1 wherein the skewer means comprise a center skewer rod being square in section and a detachable resilient double skewer member having two side skewer tines joined at a loop formed therewith and having opposite free ends thereof, said loop capable of receiving said center skewer rod therethrough, and the center skewer rod further having a retainer means for resiliently and detachably engaging the free ends of said side skewer tines.

8. A rotisserie device for shish kabob cooking comprising:
   side rail means including bearing support means for skewers;
   a chain drive and sprocket assembly between said side rail means and having a plurality of sprockets, said sprockets arranged at coupling means having skewer engageable means, the sprockets rotationally driving the coupling means for rotating skewers engageable at opposite sides thereof;
   a motor assembly means for driving said chain drive and sprocket assembly;
   handle and frame means joining said side rails; and,
   skewer means rotationally supported at the side rail bearing support means and having frontward ends thereof rotationally engaged at said skewer engageable means of the coupling means.

9. The rotisserie device as claimed in claim 8 wherein the chain drive and sprocket assembly is generally centrally located between said side rails, the sprockets being arranged interiorly of a tunnel means for enclosing the chain and sprockets and the tunnel means including opposite openings at each said coupling means for insertion therethrough of said frontward ends of the skewer means.

10. The rotisserie device as claimed in claim 8 wherein the skewer means comprise a double skewer member releasably attachable to a support skewer rod, the support skewer rod including retainer means for resiliently engaging said double skewer member and said support skewer rod including a front end thereof comprising said frontward end and being engageable at said coupling means.

11. The rotisserie device as claimed in claim 8 wherein said skewer means include handles extending outwardly of said side rail means.

12. The rotisserie device as claimed in claim 8 wherein said coupling means comprise a drive shaft having opposite prismatic bores therein for attachment of the skewer means thereat; the sprockets including a hub means, said hub means being securely fastened to said drive shaft means for the rotational driving of the sprockets.

13. A shish kabob skewer for rotisserie cooking comprising:
   a center skewer rod having a pointed front end and a portion therealong being circular in section;
   a retainer means affixed to said center skewer rod between said pointed end and circular section;
   a detachable double skewer member comprising a pair of side skewer tines resiliently joined at an engageable loop capable of receiving the center skewer rod therethrough, said side skewer tines resiliently engagable at said retainer means to be resiliently retained on said center skewer rod for gripping skewered food items to be cooked thereon.

14. The skewer as claimed in claim 13 wherein said retainer means comprises a double yoke-like configuration, said yokes having openings for receiving said side skewer tines therethrough, at rest said side skewer tines forming an oblique angle with said loop and forming an acute angle between themselves;

15. The skewer as in claim 13 wherein said center skewer rod is generally prismatic between said circular section and pointed front end.

16. A double skewer assembly comprising:

a wire double skewer having two side skewer tines forming an acute angle therebetween and joined at an end loop inclined at an oblique angle to said side skewer tines, the skewer tines including pointed free ends for penetrating food items;

a center skewer rod being generally prismatic in shape and capable of fitting through said loop of said double skewer member, and the center skewer rod including a frontward pointed end;

a retainer means spaced along said center skewer rod including a pair of open curved portions for receiving therein said side skewer tines in a resilient attachment thereof, and the center skewer rod further including a bearing notch means for rotationally residing within a bearing support; and, said center skewer rod having an end opposite said pointed end and including a handle means at said opposite end.

17. A double skewer assembly as in claim 6 wherein the bearing notch means is circular in section and located on said center skewer rod between said retainer means and handle means.

* * * * *